July 28, 1936.  S. N. HURT  2,049,297
WEIGHING SCALE
Filed May 4, 1932   5 Sheets-Sheet 1
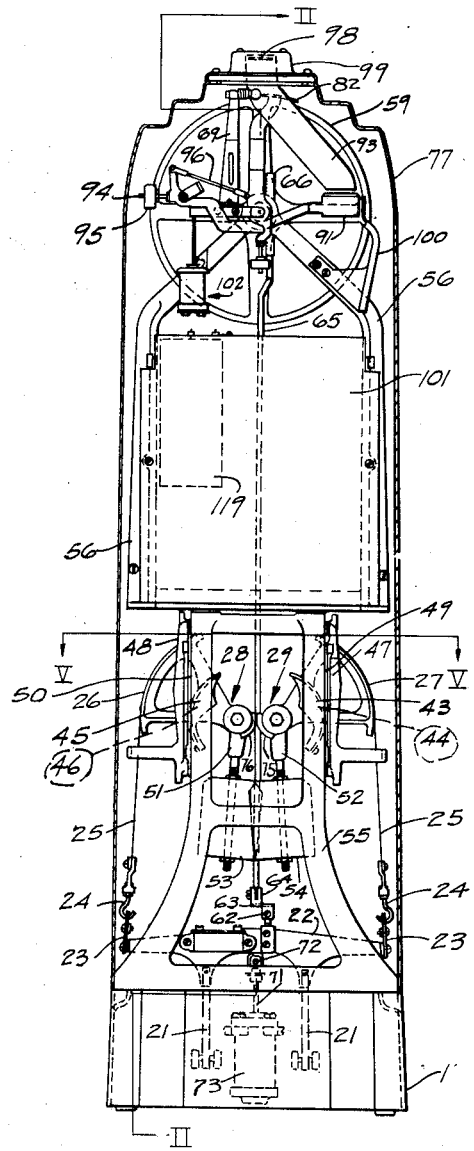
Fig I
Samuel N. Hurt
INVENTOR.
BY C. M. Marshall
ATTORNEY.

July 28, 1936. S. N. HURT 2,049,297
WEIGHING SCALE
Filed May 4, 1932   5 Sheets-Sheet 2
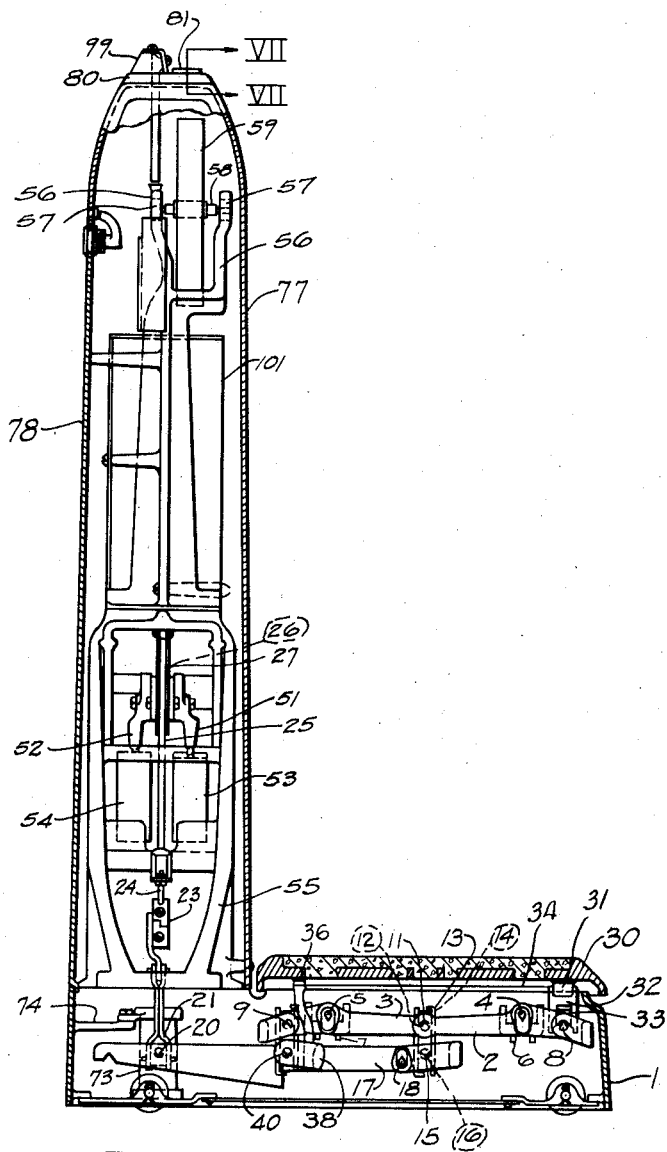
Fig. II
Samuel N. Hurt.
INVENTOR
BY
ATTORNEY

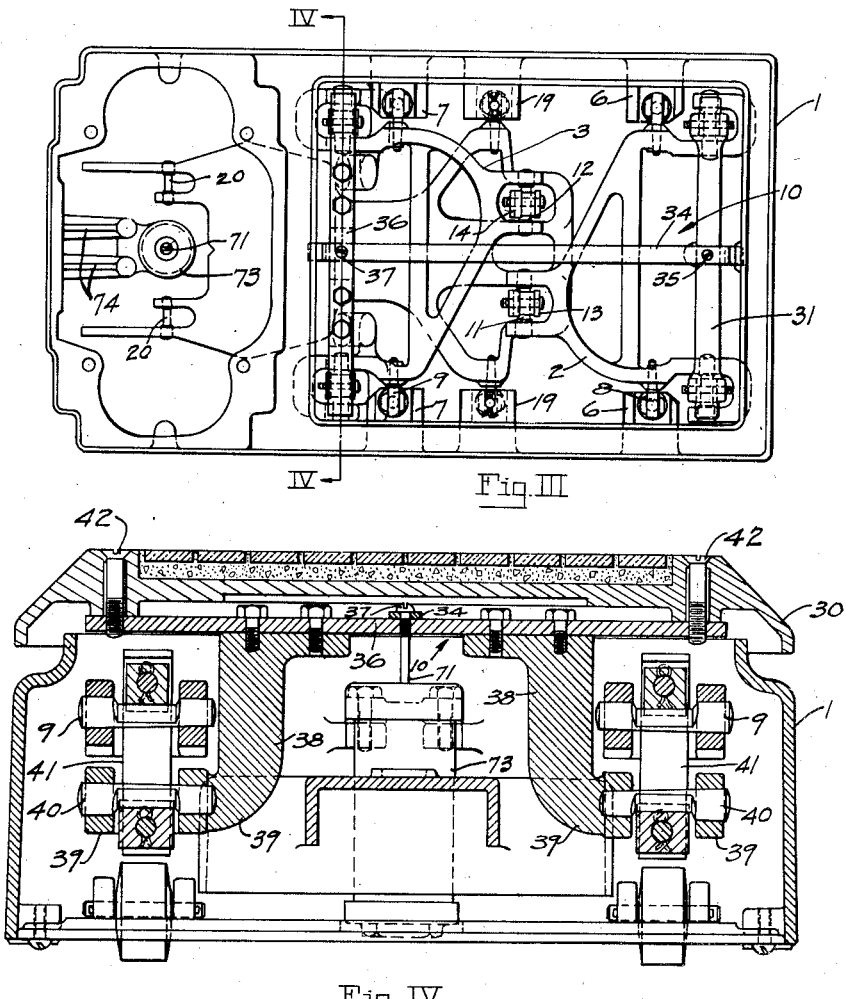

July 28, 1936. S. N. HURT 2,049,297
WEIGHING SCALE
Filed May 4, 1932 5 Sheets-Sheet 4
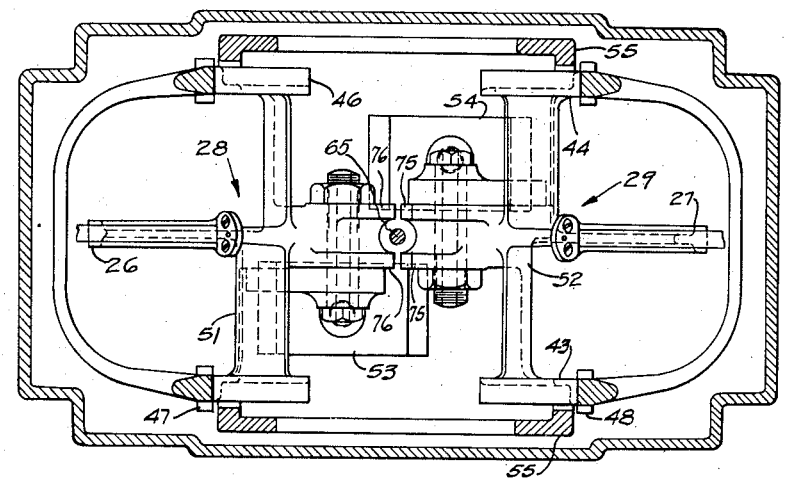
Fig. V
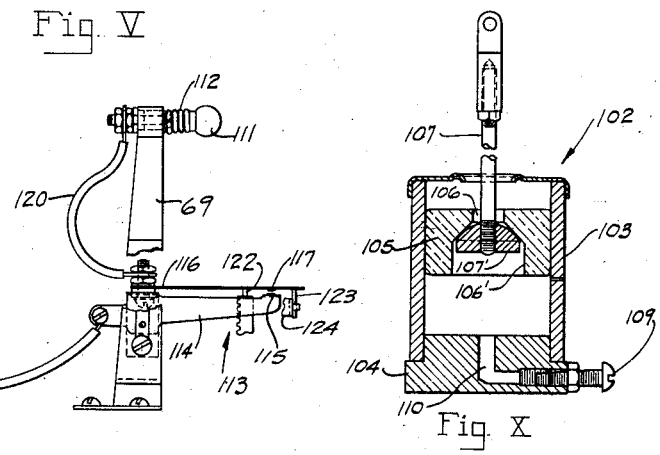
Fig. VI Fig. X
Fig. VII
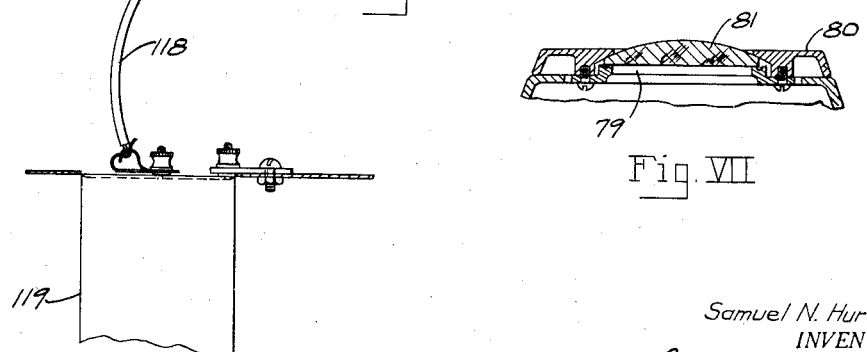
Samuel N. Hurt
INVENTOR.
BY *C. O. Marshall*
ATTORNEY.

July 28, 1936.  S. N. HURT  2,049,297
WEIGHING SCALE
Filed May 4, 1932  5 Sheets-Sheet 5
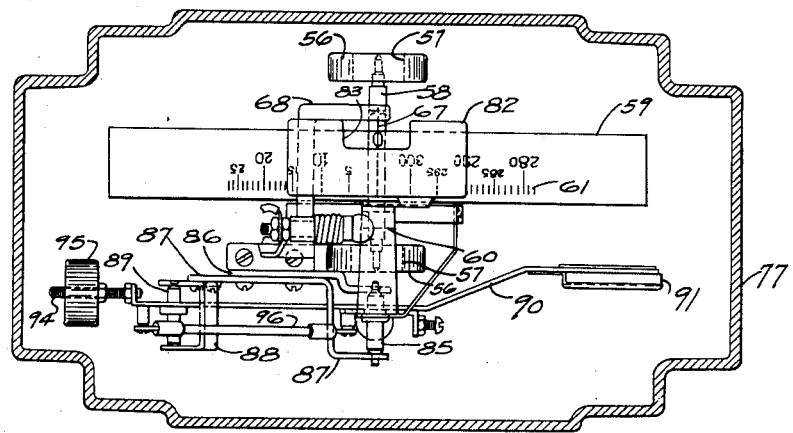
Fig. VIII
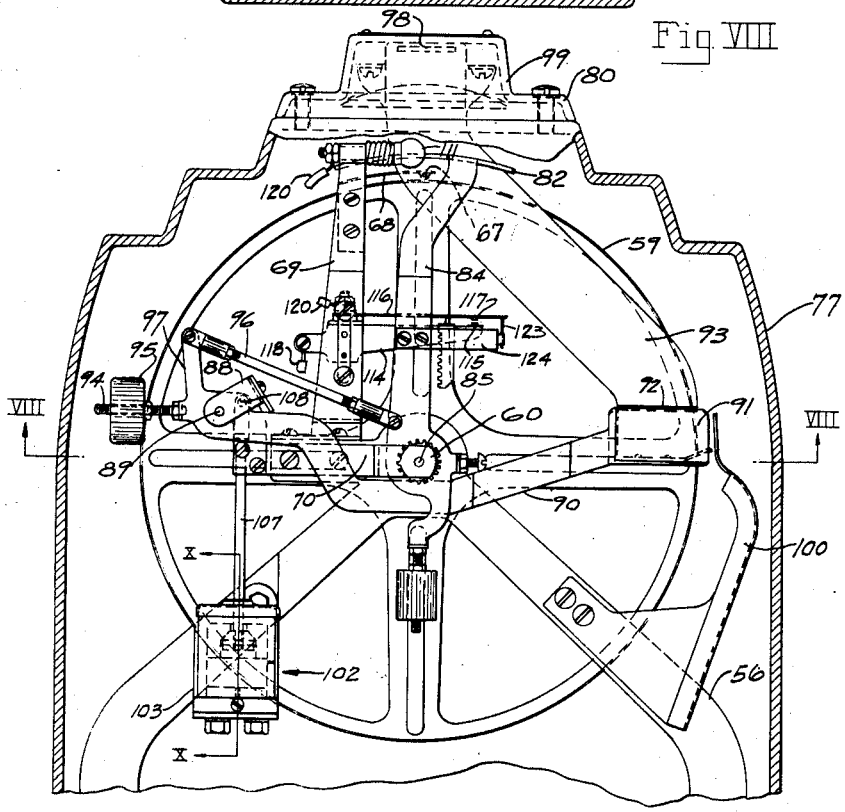
Fig. IX
Samuel N. Hurt
INVENTOR.
BY *E D Marshall*
ATTORNEY.

Patented July 28, 1936

2,049,297

UNITED STATES PATENT OFFICE 2,049,297

WEIGHING SCALE

Samuel N. Hurt, Toledo, Ohio, assignor to Toledo Scale Manufacturing Company, Toledo, Ohio, a corporation of New Jersey Application May 4, 1932, Serial No. 609,132

4 Claims. (Cl. 265—62)

This invention relates to weighing scales and particularly to scales of the type known as person weighers.

One of the principal objects of the invention is the provision of an improved, reliable and accurate pendulum load counter-balancing mechanism.

Another object is the provision of an improved person weighing scale in which the indicator is located so that the weight indication may be read with ease, and only by the person standing on the scale.

These and other objects and advantages will be apparent from the following description in which reference is had to the accompanying drawings illustrating a preferred embodiment of my invention and wherein similar reference numerals designate similar parts throughout the several views.

In the drawings:—

Figure I is a back elevational view with housing parts broken away showing the assembled mechanism of a device embodying the invention.

Figure II is a side elevational view of the device, with the housing members sectioned on the line II—II of Figure I.

Figure III is an enlarged plan view of the base and load supporting mechanism, with the platform removed.

Figure IV is an enlarged cross sectional view through the base and load supporting mechanism, substantially along the line IV—IV of Figure III.

Figure V is an enlarged cross sectional plan view, substantially along the line V—V of Figure I, illustrating in detail the relative positions of the load counterbalancing pendulums.

Figure VI is an enlarged fragmentary view of the electric illuminating means, the current source and the circuit breaking switch.

Figure VII is an enlarged fragmentary cross sectional view, through the indicating sight opening, substantially along the lines VII—VII of Figure II.

Figure VIII is an enlarged fragmentary plan view of the indicator covering means and the coin actuated timing mechanism, in which the enclosing housing is broken away substantially along the line VIII—VIII of Figure IX.

Figure IX is an enlarged fragmentary back elevational view of the indicating mechanism, indicator cover and coin actuated timing mechanism, a portion of the enclosing housing is broken away; and Figure X is an enlarged cross sectional view through the timing dashpot, substantially along the line X—X of Figure IX.

Referring to the drawings in detail, a base 1, preferably a rigid iron casting, contains and suitably supports load receiving mechanism, which comprises a pair of levers of the first order 2 and 3, rockingly mounted by means of fulcrum pivots 4 and 5, respectively, upon bearings situated in brackets 6 and 7. These brackets in this embodiment project inwardly from the walls of the base 1. Levers 2 and 3 are also provided with load pivots 8 and 9 upon which a platform supporting spider 10 is mounted. The opposite ends of these levers are equipped with pivots 11 and 12, which are engaged by bearing loops 13 and 14, to connect the levers 2 and 3 to pivots 15 and 16 fixed in the end of an extension lever 17, fulcrumed with its pivots 18 on suitable bearings stationed on inwardly extending brackets 19. Lever 17 is also of the first order and has a pair of force transmitting pivots 20 adjacent its other end which engage loops 21 depending from a yoke 22 provided with connecting links 23. The upper ends of these links are provided with apertures for the reception of hooks 24 secured to the lower end of flexible metallic tapes 25, which are fastened to and overlie cam-like surfaces on power sectors 26 and 27, respectively, of load counterbalancing pendulums 28 and 29. To support the person desiring to obtain his weight a platform 30 is provided which is fastened to the spider 10 resting upon the load pivots of the levers 2 and 3. This spider consists of a rear transverse cast bar 31, having an integral downwardly extending bearing bracket 32 at each end. In these brackets bearings 33 are fixed which rest upon the load pivots 8 fixed in the lever 2. A longitudinally extending bar 34, engages transverse bar 31 and is fastened thereto by a screw 35, and similarly engages a forwardly located transverse bar 36 to which it is swivelly fastened by screw 37, so that it may turn slightly about the axis of this screw. Downwardly projecting brackets 38 are fastened to each end of the bar 36. These have curved bifurcated extending portions 39 in which pivots 40 are fixed which engage bearing loops 41 (see Figure IV). The upper ends of these loops engage the load pivots 9 in the lever 3. To retain the load supporting platform 30, which rests upon the transversely extending bars 31 and 36 screws 42 extend through platform and are threaded into these bars.

The load counter-balancing pendulums 28 and 29, in addition to the cam-like surfaces of the sectors 26 and 27 previously mentioned, comprise fulcrum sectors 43, 44, 45 and 46. In this embodiment, these sectors are integral portions of power sectors 26 and 27 and with track members 47 and 48, from which they are suspended by flexible metallic tapes 49 and 50, form varying fulcrum points for the load counterbalancing pendulums 28 and 29 which also comprise pendulum bodies 51 and 52 and weights 53 and 54. The track members 47 and 48 are secured to a rigid frame 55 which is erected on one end of the base 1 and securely fastened thereto. Surmounting the frame 55 is a bifurcated extension member 56 which is adapted to receive a pair of antifriction ball bearings 57 in its upper furcations in which a shaft 58, supporting a rotatable chart 59, and a pinion 60 is fulcrumed. This chart 59 bears a series of weight indicia 61.

The yoke 22, to which the force transmitting metallic tapes 25 are connected, has an upwardly extending member 62 fastened to it, near a point midway between the connections to the flexible metallic tapes 25. To the upper end of this member is fastened a resilient rack foot plate 63 having an upwardly extending rack foot 64. A rack rod 65 is positioned in the rack foot 64 and extends upwardly between the load counterbalancing pendulums 28 and 29 so that the teeth of a rack 66, fastened to the upper end of the rack rod 65, engage the teeth of the pinion 60.

When a load is placed on the platform 30, the force, resulting from the action of gravity on such load, is transmitted through the hereinbefore described lever mechanism to the load counterbalancing pendulums which are moved through an angle proportionate to the weight of the load. The rack 66, which is operably connected, revolves the chart through a commensurate angle and an index 67 points invariably to the proper weight indicium on the chart.

The index 67 is fixed to an index frame 68 fastened to an upwardly extending post-like member 69 secured to a horizontally extending portion 70 of the bifurcated frame 56.

To insure shockless and vibrationless operation of the scale, a dashpot plunger 71 is pivotally suspended at 72 from the yoke 22. This plunger co-operates, in a manner well known, with a dashpot body 73, secured to brackets 74 extending inwardly from the rear wall of the base, and thus effectively dampens any vibration caused by the operation of the scale and absorbs shocks occasioned by persons jumping on the platform. This dashpot, however, need not be placed in the position shown; it may be placed in any convenient position, where its damping effect is sufficient for the capacity of the scale.

The counterbalancing pendulums 28 and 29 which face outwardly in opposite directions have concentric inwardly facing sectors 75 and 76 (see Figure V) secured to the hubs which are formed at the junction of the bodies 51 and 52 and the sectors 26 and 27, respectively. These sectors, when the scale is in an operative position, do not touch each other. When, however, the scale is placed in an extreme out of level position, the pendulum assembly on the side toward which the scale is tipped is prevented from swinging out of position by the track member along which its fulcrum sectors roll, while the other pendulum tends to swing away from its track. When the scale is thus tilted, the sectors engage each other and prevent displacement of the pendulums from the track members 47 and 48. The design and location of these sectors is such that the rack rod 65 may pass freely between them at all times.

A casing 77, which is provided with a removable back plate 78, encloses the frame members 55 and 56 and the mechanism assembled thereto. An opening 79 is provided in the top of the casing 77 immediately above the chart 59 and the index frame 68. This opening is covered by a frame 80 which retains a magnifying lens 81 provided for the purpose of magnifying the weight indicia.

For many purposes, the scale so far described is sufficient to meet the requirements of an efficient and accurate person weighing scale. Sometimes, however, the merchant owning the scale desires to charge a small fee for the service, and to collect this fee automatically. For this reason, I have provided coin controlled mechanism which is entirely independent of the weighing mechanism and, therefore, exerts no reactive influence thereon. A shutter 82 which is curved to conform to the curvature of the chart 59 overlies that portion of the chart which is immediately underneath the opening 79 in the casing 77 and, with the exception of the zero indicium which is visible in a small cut-out portion 83, successfully covers the indicia on the chart. The zero indicium is printed on a line below the other weight indicia on the chart so that it is the only figure which is visible when the shutter is in place. An arm 84 to which the shutter 82 is fastened is pivoted on a pintle 85 which is mounted in co-axial alignment with the shaft 58 on which the indicating chart 59 is rotatably mounted. Members 86 and 87 form a bracket in which the pintle 85 is fulcrummed; the member 87 has a rearward extension to which a substantially U-shaped member 88 is secured, forming a bearing bracket for a pintle 89 which extends through the body of a coin actuated lever 90. This lever is provided with a pocket-like coin receiving member 91, which in normal position, lies beneath an opening 92 of a coin chute 93. The opposite end of the coin actuated lever 90 is provided with a stud 94 upon which a balancing weight 95 is threaded. By means of this weight, the balance of the lever 90 may be adjusted so that it is displaced by the weight of a certain coin. An adjustable connecting rod 96 is provided to pivotally connect an upwardly projecting portion 97 of the lever 90 to the shutter arm 84. The open upper end of the hereinbefore mentioned coin chute 93 registers with a coin slot 98 in a cap-like portion 99 which is an integral part of the lens frame 80 surmounting the casing 77.

The operation of a scale of the type described, equipped with the coin actuating mechanism, is substantially as follows: The person desiring to obtain his weight, steps on the platform, drops a proper coin, into the slot 98, which then descends through the coin chute 93 and strikes the pocket-like member 91 at the end of the lever 90. The weight of the coin overbalances this lever, causing it to turn in clock-wise direction about the axis of its pintle 89. The small connecting rod 96 pivoted to the portion 97 and to the shutter arm 84, causes the shutter arm and the thereto attached shutter 82 to rotate on its fulcrum pintle 85, also in a clockwise direction, thus exposing the proper weight indicium on the chart, to the view of the person standing on the scale. The lever 90 at the point where the small connecting rod 96 is attached has considerable mechanical advantage and the weight of the coin in the pocket-like member turns the shutter 82 very rapidly. The coin is prevented from dropping out of the open end of the receptacle 91, by a coin guide 100, until the lever 90 has reached its lowermost position. This guide also serves the purpose of guiding the coin into a coin receptacle 101 stationed beneath the chart on the bifurcated extension member 56, provided for the accumulation of such coins.

To prevent the shutter 82 from returning to its covering position, before the person standing on the scale has had opportunity to note his weight, I have provided a damping device in the form of a dashpot 102 to retard the return speed of the shutter, which may be of either the air damping or oil damping type. In this embodiment of the invention I have shown a dashpot of the air damping type which comprises a body 103 (see Figure X) formed from a piece of brass tubing whose inside wall is highly polished. This is attached to a base 104 by brazing, soldering or by any other desirable means. A plunger 105 made of graphite, provided with a centrally located aperture 106 and a concentric countersunk hole 106₁, is slidably positioned in the body 103 pivotally depending from the coin actuated lever 90 at the point marked 108 and projecting through the apertures 106 and 106₁ of the plunger 105 is a plunger stem 107 having a valve member 107₁ substantially semi-spherical in shape, threaded on its lower end.

When the shutter is displaced from its covering position by the weight of a coin in the receptacle 91, the plunger stem partakes of the rapid movement of the lever 90 since its is pivotally secured to it. The movement of the valve member is much more rapid than that of the plunger 105 which is somewhat retarded by the air underneath, however, as the valve is now open, it does descend with sufficient rapidity so that it is again seated on the semi-spherical valve member, closing the aperture 106 when the coin drops from the receptacle 91. The return speed of the lever 90, which is overbalanced by the weight 95, is now controlled by the damping action of the dashpot 102 in the well known manner as the semi-spherical member on the plunger stem seated in the countersunk valve opening effectively retards the flow of air during the return stroke. The rate of retardation, however, may be adjusted by a valve screw 109 which controls the flow of air through an angular hole 110 in the base 104 in a manner so widely known that I will not describe it to any greater extent.

To enable the person who is weighing himself, to readily read the weight indication at night or during the day-time when the scale is placed in a dark location, I have provided an illuminating system comprising a small electric light bulb 111 (see Figure VI), a socket 112 mounted in the upper end of the upwardly extending post-like member 69 which is fastened to the bifurcated frame 58. A circuit breaking switch 113 is also fastened to this post, but insulated therefrom. This switch comprises a rigid arm 114 provided with a contact point of silver or platinum 115 and a flexible switch blade 116, which in the embodiment shown, is a piece of highly tempered steel ribbon, insulated from the rigid arm 114 and provided with a contact point 117 adapted to engage the point 115. The switch blade has a normal bias to complete the circuit. An electrical lead 118 connects one pole of a dry cell 119 to the contact 115; another lead 120 connects the contact 117 to one of the filament terminals of the lamp 111, and the other pole of the dry cell 119 is grounded to the scale mechanism frame to complete the circuit when the points 115 and 117 engage each other. Although in this embodiment a dry cell is shown as a source of current, it will be readily seen that other current sources may be employed by using electric equipment of the proper capacity. The contacts 115 and 117 are normally held out of engagement when there is no load on the platform by an insulating pin 122 made from di-electric material and fixed in the upper end of the rack 66, and by an additional insulating pin 123 which is fixed to a laterally extending arm 124 screwed or riveted to the shutter arm 84.

When a person steps on the platform of the scale, the rack being actuated by the weighing mechanism, will be drawn downwardly, rotating the chart. The contact 117 in the switch blade 116, however, is still prevented from engaging the lower contact 115, by the insulating pin 123. When a coin is inserted and the shutter moved from its covering position, the laterally extending arm 124 moves with it, withdrawing the pin 123 and allowing the contacts 115 and 117 to engage each other and complete the circuit, thus energizing the light bulb 111 to illuminate the chart. The arrangement of these parts is such that it requires two operations, viz. a person must step on the platform and a coin must be deposited to illuminate the chart. If the second retaining member comprising the pin 123 and the arm 124 were not provided, it will readily be seen that the available current in the dry cell could be exhausted in a comparatively short time by boys or irresponsible mischievous persons repeatedly stepping on the scale or placing a load thereon.

The embodiment of my invention herein shown and described is to be regarded as illustrative only, and it is to be understood that the invention is susceptible to variation, modification and change within the spirit and scope of the subjoined claims.

Having described my invention, I claim:

1. In a weighing scale, in combination, a frame, said frame including a pair of inwardly facing substantially vertical track members, flexible metallic fulcrum ribbons, means connecting the upper ends of said fulcrum ribbons to said frame, fulcrum sectors adapted to roll upwardly along said ribbons, means connecting the lower ends of said ribbons to said fulcrum sectors, a power sector rigidly connected to each of said fulcrum sectors, said power sectors being curved about centers adjacent to the centers of curvature of the fulcrum sectors to which said power sectors respectively are rigidly connected, flexible metallic power ribbons overlying said power sectors and depending therefrom, means connecting the upper ends of said power ribbons to said power sectors, means to cause forces to act downwardly upon said power ribbons, a pendulum rigidly connected to each of said fulcrum sectors, said pendulums being arranged to swing inwardly past each other to counterbalance the effect of forces acting downwardly upon said power ribbons, and an additional sector rigidly connected to each of said fulcrum sectors and concentric therewith, said additional sectors extending toward each other with their curved faces adjacent each other and adapted to engage and thus prevent said fulcrum sectors from swinging away from their respective track members.

2. In a weighing scale, in combination, a frame having inwardly facing track members, flexible fulcrum ribbons, means connecting the upper ends of said fulcrum ribbons to said frame, fulcrum sectors adapted to roll upwardly on said fulcrum ribbons, means connecting the lower ends of said fulcrum ribbons to said fulcrum sectors, an additional sector rigidly connected to each of said fulcrum sectors and having a surface curved about the center of curvature of the fulcrum sector to which it is connected, the curved surfaces of said additional sectors lying adjacent each other whereby said fulcrum sectors are prevented from swinging away from their track members by engagement of the curved surfaces of said additional sectors with each other.

3. In a weighing scale, in combination, a frame having inwardly facing track members, flexible metallic fulcrum ribbons, means for attaching the upper ends of said ribbons to said frame, fulcrum sectors adapted to roll upwardly on said fulcrum ribbons, means for attaching the lower ends of said fulcrum sectors to said fulcrum ribbons, a load-counterbalancing pendulum rigidly connected to each of said fulcrum sectors, said load-counterbalancing pendulums being offset with respect to each other and positioned to swing past each other to load-counterbalancing positions, and an additional sector rigidly fixed to each power sector and concentric therewith, said additional sectors extending toward each other with their curved faces in close proximity to prevent said fulcrum sectors from swinging away from said track members.

4. In a weighing scale, in combination, a frame having inwardly facing track members, flexible metallic fulcrum ribbons, means for attaching the upper ends of said ribbons to said frame, fulcrum sectors adapted to roll upwardly on said fulcrum ribbons, means for attaching the lower ends of said fulcrum sectors to said fulcrum ribbons, a load-counterbalancing pendulum rigidly connected to each of said fulcrum sectors, said load-counterbalancing pendulums being offset with respect to each other and positioned to swing past each other to load-counterbalancing positions, a power member rigidly fixed to each of said fulcrum sectors and extending outwardly beyond the fulcrum sector to which it is fixed, means for causing forces to act downwardly on said power members, and an additional sector rigidly fixed to each power sector and concentric therewith, said additional sectors extending toward each other with their curved faces in close proximity to prevent said fulcrum sectors from swinging away from said track members.

SAMUEL N. HURT.